United States Patent [19]

Sekmakas

[11] 3,896,017
[45] July 22, 1975

[54] ELECTRODEPOSITION OF THERMOSETTING COATING AT THE CATHODE

[75] Inventor: Kazys Sekmakas, Chicago, Ill.

[73] Assignee: DeSoto, Inc., Des Plaines, Ill.

[22] Filed: Mar. 1, 1973

[21] Appl. No.: 337,007

[52] U.S. Cl. ............................................... 204/181
[51] Int. Cl. ............................................. B01k 5/02
[58] Field of Search ................................... 204/181

[56] References Cited
UNITED STATES PATENTS

| | | | |
|---|---|---|---|
| 3,640,926 | 2/1972 | Slater et al. | 204/181 |
| 3,729,435 | 4/1973 | Bachmann et al. | 204/181 |

Primary Examiner—Howard S. Williams
Attorney, Agent, or Firm—Dressler, Goldsmith, Clement & Gordon, Ltd.

[57] ABSTRACT

Thermosetting coatings exhibiting a superior cure on baking are deposited at the cathode by combining a water dispersible salt of an acid with a polyamine resin with a water dispersible heat-hardening phenolic resin. The polyamine resin is preferably hydroxy functional and it is precondensed with the phenolic resin to insure codeposition at the cathode. The use of a phenolic resin avoids the usual retardation of an N-methylol caused by the amine groups of the polyamine resin.

6 Claims, No Drawings

ELECTRODEPOSITION OF THERMOSETTING COATING AT THE CATHODE

The present invention relates to the electrodeposition at the cathode of thermosetting coatings which exhibit a superior cure on baking.

Electrodeposition of thermosetting coatings from aqueous medium onto the anode is well known, but the achievement of hard, adherent, flexible and corrosion resistant coatings has resisted the art. High gloss has also been difficult to obtain. The art has sought to avoid the difficulties inherent in anodic deposition by employing aqueous systems which electrodeposit at the cathode, but considerable difficulty has been encountered as a result of which cathodic electrodeposition has not succeeded in displacing anodic electrodeposition in commerce.

In anodic electrodeposition, an acidic resin in salt form is dispersed in water, the salt dissociating in the aqueous bath to place the resin in dispersed polyanionic form. A unidirectional electrical current passing through the aqueous bath deposits the resin at the anode as a water insoluble acidic resin. This acidic resin may contain other reactive groups, such as hydroxy groups, and an aminoplast resin is codeposited with it so that, on baking, the coating cures to provide desired properties. However, any residual acidity in the resin reduces its corrosion resistance, and metal ions from the anode are trapped within the film and they also adversely affect properties. Also, great hardness in a flexible and impact resistant adherent film has not been obtained.

The corresponding cathodic systems vary from the anodic systems essentially in that amine functionality replaces the acid functionality, and a salt is formed with an acid instead of with a base. The amine resin in salt form disperses in the aqueous bath and dissociates to form a polycationic resin which responds to a unidirectional electrical current by depositing at the cathode as a water insoluble amine resin. Aminoplast resin is codeposited with the amine resin in normal fashion and baked and interesting films are obtained in this way. Still, the properties are limited, and the cathodic systems have been unable to replace the anodic systems.

In this invention, the amine resin which is intended to be dispersed in aqueous acidic medium is combined with a phenolic resin and it is found that the composite responds more favorably to baking providing a superior cure in comparison with the conventionally used aminoplast resins.

From the standpoint of the chemistry involved, the acidic resins which are deposited at the anode contain acid groups which function to catalyze the aminoplast cure. In contrast, the amine resins which are deposited at the cathode contain amine groups which function to retard the amnoplast cure.

In this invention, the amine groups do not retard the cure of the codeposited phenolic resin.

In this invention, from 2% to 60%, preferably from 5% to 50%, based on the total weight of resin in the system, is constituted by a water soluble or dispersible heat-hardening phenol-formaldehyde resin, commonly termed a phenolic resin. These phenolic resins are illustrated by the well-known non-gelled alkaline condensates of phenol with excess formaldehyde known as "A" stage resols. The conventional reaction is carried out in the presence of a basic catalyst under moderate conditions of elevated temperature and for a limited period of time so as to avoid gelation of the resin.

In the conventional cathodic electrodeposition using the aminoplast resins normally employed, the aminoplast resins, since they contain numerous nitrogen atoms, are electrophoretically propelled toward the cathode in the acidic electrocoating bath by the unidirectional electrical current which is employed. With the heat-hardening water soluble or dispersible phenolic resins used herein, these do not include nitrogen atoms and they do not, per se, have any strong tendency to migrate toward the cathode.

In order to accentuate the desired electrophoretic movement, the water dispersible heat-hardening phenolic resin is heat reacted with the polyamine resin to cause a precondensation to take place, and the two resins to become fully compatibilized with one another. The fact of reaction is easily observed by the increase in viscosity which takes place as the condensation reaction progresses.

This precondensate of the heat-hardening phenolic resin with the polyamine resin not only provides an efficient basis for coelectrodeposition, but it also enhances the speed of ultimate cure.

The polyamine resins which are preferably used herein are preferably hydroxy functional, the hydroxy groups of the polyamine resin entering into the desired curing reaction with the methylol group carried by the phenolic resin.

It is particularly preferred to employ as the polyamine resin the reaction product of a solvent-soluble epoxy resin, preferably advanced by reaction with up to about 10% by weight of diisocyanate, with a monosecondary amine, as is more fully described in my prior applications Ser. No. 162,659, filed July 14, 1971, and Ser. No. 239,305, filed Mar. 29, 1972, the disclosures of which are hereby incorporated by reference. It is important that the reaction product be substantially devoid of epoxy functionality which is unstable in the presence of the amine groups, especially in an aqueous electrocoating bath.

As is conventional with aqueous electrocoating baths intended for electrodeposition at the cathode, these should have a pH of about 7 or lower, preferably in the range of from 6–2, and more preferably in the range of pH 5.5–3.5.

The resins which are dispersed in the electrocoating bath are desirably employed in the form of a solution in water miscible organic solvent, the solvent being desirably present in an amount of at least 10% by weight, based on the weight of the resins which are dispersed in the water phase. These water miscible solvents are preferably present in an amount not in excess of 150%, based on the weight of the dispersed resins. The solvent is most desirably present in an amount of from 75% – 125%, on the same basis. The class of water miscible organic solvents useful herein is well known, and these are illustrated in the accompanying examples.

The aqueous electrocoating bath is normally formulated to have a resin solids content in the range of 2–20%, preferably 5–15%, and the electrodeposited films are baked to cure the same, baking temperatures of 250°F. to 600°F. for periods varying from about 20 seconds at the highest temperature to about an hour at the lowest temperature being conventional. Preferred bakes are from 325°F. to 450°F. for from about 2 to 40 minutes.

EXAMPLE 1

Polyamine Resin for Phenolic Condensate

Charge 525 parts methyl ethyl ketone and 1,425 parts epoxy resin — (diglycidyl ether of bisphenol A having an epoxy equivalent weight of 950 such as Shell Epon 1004) [1.5 equivalents epoxide] into reactor and heat to 60°C. Add 38 parts toluene diisocyanate over a 20 minute period and hold for 1 hour at 60°C. Cool to 35°C. and add, slowly over a 30 minute period at 35°C., 157 parts diethanol amine (1.5 equivalents). Hold for 30 minutes, then heat to 70°C. Hold for 2 hours at 70°C. Cool and add 300 parts 2-butoxy ethanol to provide an epoxy-free hydroxy-functional product having the following characteristics:

| | |
|---|---|
| Solids | 67.0% |
| Viscosity (Gardner) | Z4 – Z5 |
| Acid value (non-volatile) | 0.1 |

Example 2

Preparation of Water Soluble Heat Reactive Intermediate and Condensation thereof with Polyamine Resin

| Parts by Weight | |
|---|---|
| 210 | Phenol |
| 114 | Paraformaldehyde |
| 196 | Deionized Water |
| 16 | Diethanol Amine |

Charge the above into reactor and heat to 97°C. in 90 minutes. Hold for 1 hour and then add 1,675 parts of the 67% solids solution of Example 1. Heat to 97°C. Set empty trap and collect distillate (298 grams water collected including water of condensation from reaction of phenolic resin with hydroxy groups of the polyamine resin). Remove trap. Hold for 2 hours at reflux temperature. Cool and add 300 parts 2-ethoxy ethanol solvent to provide a product having the following final characteristics:

| | |
|---|---|
| Solids | 59.9% |
| Viscosity (Gardner) | Z5 – Z6 |
| Acid Value | 0.1 |

Evaluation of the Resin of Example 2

Premix, with fast agitation: 130 parts of the resin condensate solution of Example 2; 20 parts 2-ethoxy ethanol solvent; and 13 parts acetic acid. Then slowly add 800 parts deionized water, again with fast agitation, to provide a clear solution having a solids content of 8.2% and a pH of 4.3.

Zinc phosphate treated steel panels were coated from the above clear solution by electrical deposition on the cathode using a bath temperature of 27°C., a deposition time of 60 seconds, a potential of 100 volts, and a current of 6.0 amps, which fell off to 0.15 amp at the end of the 60 second period. The resulting coating on the cathode was cured in an electric oven for 20 minutes at 450°F. A glossy, very hard and flexible coating was obtained, which had th following characteristics which are far superior to any which I have ever encountered in anodic electrocoating:

| | |
|---|---|
| Pencil hardness | 4H |
| Impact (direct 80 in./lb.) | Pass |
| Impact (reverse 60 in./lb.) | Pass |
| Flexibility (¼ inch Mandrel) | Pass |
| Loss of adhesion after bending: | None |
| Gloss (60°Photovolt) | 88 |
| Resistance to 100 methyl ethyl ketone rubs | Excellent |
| Resistance to hot (160°F) 1½% synthetic detergent bath | Excellent (Pass 250 hours) |

Similar results were obtained when this coating was utilized over aluminum and galvanized steel panels.

Example 3

Phenolic Intermediate

| Parts by Weight | |
|---|---|
| 210 | Phenol |
| 114 | Paraformaldehyde |
| 196 | Deionized water |
| 16 | Sodium hydroxide |

Heat the above, slowly, to 90°C. to reflux. Hold for one hour and cool to provide a product having a solids content of 55% and a Gardner-Holdt viscosity of A–B.

Example 4

Polyamine Resin

Parts by Weight

750 Diglycidyl ether of Bisphenol A having an average molecular weight of 1000 (1.5 epoxy equivalents) (Epon 1001)

210 Dehydrated castor fatty acids (0.75 equivalent)

2 Triethyl amine

100 Methyl ethyl ketone

Heat the above to 120°C. and hold for an acid value of less than 3. Cool to 60°C. and add 200 parts methyl ethyl ketone and 0.2 part dibutyl tin oxide. Add 30 parts toluene diisocyanate over a 15 minute period and hold for one hour at 60°C. Heat to 90°C. and hold for 30 minutes. Cool to 70°C. and add 77 parts diethanol amine (0.75 equivalent) over a 15 minute period. Hold for 30 minutes at 40°C. Reheat to 70°C. and hold for 2 hours to provide a product having the following final characteristics:

| | |
|---|---|
| Solids: | 78.6% |
| Viscosity (Gardner-Holdt) | Z4–Z5 |
| Acid Value | 0.0 |

Example 5

Phenolic Condensate

Parts by Weight

600 Polyamine resin solution of Example 4 (78.6% solids)
567 Heat reactive phenolic intermediate of Example 1 (55% solids)
200 2-butoxy ethanol Set empty trap. Heat to 90°C. and collect solvent in trap. When 300 parts of distillate (mostly water) are collected, remove trap and hold for 1 hour at reflux.

Cool and add 100 part 2-butoxy ethanol to provide a product having the following final characteristics:

| | |
|---|---|
| Solids | 71.8% |
| Viscosity (Gardner-Holdt) | Z6–Z7 |
| Acid Value | 0.0 |

The phenolic condensate of Example 5 was utilized in the same formulation to prepare acidic water solutions at 8% solids, as described in Example 2.

Excellent corrosion resistance and physical properties resulted when the coating was applied by electrocoating at the cathode as described in Example 2 on aluminum and steel substrates.

The invention is defined in the claims which follow.

I claim:

1. A method of electrodepositing a thermosetting coating at the cathode of a unidirectional electrical system comprising passing a unidirectional electrical current through an aqueous electrocoating bath comprising water having dispersed therein a water dispersible salt of an acid with an hydroxy functional polyamine resin, said polyamine resin being the reaction product of a solvent-soluble epoxy resin advanced by reaction with up to about 10% by weight of diisocyanate and reacted with monosecondary amine to be substantially devoid of epoxy functionality, said polyamine resin being precondensed with from 2% to 60%, based on the total weight of resin, of a water dispersible heat-hardening phenolic resin to cause the codeposition of said polyamine resin and said phenolic resin in the form of a film of coating at the cathode, removing the coated cathode from said bath and then baking the coated cathode to cure said polyamine resin by reaction thereof with said phenolic resin.

2. A method as recited in claim 1 in which said phenolic resin is present in an amount of from 5% to 50%, based on the total weight of resin.

3. A method as recited in claim 1 in which said phenolic resin is an "A" stage resol.

4. A method as recited in claim 1 in which said aqueous electrocoating bath has a pH in the range of 6–2.

5. A method as recited in claim 4 in which said bath includes water miscible organic solvent in an amount of from 10% – 150%, based on the weight of the dispersed resins.

6. A method as recited in claim 5 in which said bath has a resin solids content in the range of 2–20%.

* * * * *